United States Patent [19]
von Harpe et al.

[11] Patent Number: 5,399,325
[45] Date of Patent: * Mar. 21, 1995

[54] NITROGEN OXIDES REDUCTION USING A UREA HYDROLYSATE

[75] Inventors: Thure von Harpe, Meerbusch; Reinhard Pachaly, Kerpen, both of Germany; M. Linda Lin, Naperville, Ill.; Daniel V. Diep, Aurora, Ill.; Joseph B. Wegrzyn, Naperville, Ill.

[73] Assignee: Nalco Fuel Tech, Naperville, Ill.

[*] Notice: The portion of the term of this patent subsequent to Feb. 26, 2009 has been disclaimed.

[21] Appl. No.: 820,907

[22] Filed: Feb. 26, 1992

Related U.S. Application Data

[63] Continuation-in-part of Ser. No. 561,154, Aug. 1, 1990, Pat. No. 5,240,688.

[51] Int. Cl.⁶ ............................................. C01B 21/00
[52] U.S. Cl. .................................................... 423/235
[58] Field of Search .............................. 423/235, 239.1

[56] References Cited

FOREIGN PATENT DOCUMENTS
54-86020 7/1979 Japan.
2-191528 7/1990 Japan.

OTHER PUBLICATIONS
Kirk–Othmer *Encyclopedia of Chemical Technology* 3rd ed. vol. 2 1978; pp. 519–520.
Translated Abstract of JP'020.

*Primary Examiner*—Gary P. Straub
*Assistant Examiner*—Thomas G. Dunn, Jr.
*Attorney, Agent, or Firm*—St. Onge Steward Johnston & Reens

[57] ABSTRACT

The present invention relates to a process for the use of a urea hydrolysate for nitrogen oxides reductions. More particularly, the process involves forming a urea hydrolysate and introducing the hydrolysate into a combustion effluent under conditions effective for the reduction of nitrogen oxides.

10 Claims, 2 Drawing Sheets

FIG. 2

NITROGEN OXIDES REDUCTION USING A UREA HYDROLYSATE

RELATED APPLICATION

This application is a continuation-in-part of U.S. patent application having Ser. No. 07/561,154 entitled "Process for the In-Line Hydrolysis of Urea" filed in the names of von Harpe and Pachaly on Aug. 1, 1990, now U.S. Pat. No 5,240,688, the disclosure of which is incorporated herein by reference.

TECHNICAL FIELD

The present invention relates to a process for the reduction of nitrogen oxides ($NO_x$, where x is an integer, generally 1 or 2) in a combustion effluent by the use of the hydrolysis products of urea, which provides advantages over conventional $NO_x$ reducing processes.

Carbonaceous fuels can be made to burn more completely and with reduced emissions of carbon monoxide and unburned hydrocarbons when the oxygen concentrations and air/fuel ratios employed are those which permit high flame temperatures. When fossil fuels are used in suspension fired boilers, such as large utility boilers, temperatures above about 2000° F. and typically about 2200° F. to about 3000° F. are generated.

Unfortunately, such high temperatures tend to cause the production of thermal $NO_x$, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F., as well as gas turbines and diesel engines.

Nitrogen oxides are troublesome pollutants which are found in the combustion streams of boilers when fired as described above, and comprise a major irritant in smog. It is further believed that nitrogen oxides can undergo a process known as photochemical smog formation, through a series of reactions in the presence of some hydrocarbons. Moreover, nitrogen oxides comprise a significant contributor to acid rain and have been implicated as contributing to the undesirable depletion of the ozone layer. They may also impact on the warming of the atmosphere commonly referred to as "the greenhouse effect". In addition, some or all of these effects are believed to be attributable to nitrous oxide.

Recently, many processes for the reduction of $NO_x$ in combustion effluents have been developed. They can generally be segregated into two basic categories: selective and non-selective. The selective processes are more desirable because of economic considerations. Among selective nitrogen oxides reducing processes, there is a further division between selective catalytic reduction (SCR) and selective non-catalytic reduction (SNCR) processes. Although SCR processes are thought capable of achieving higher levels of nitrogen oxides reductions, SNCR processes are often preferred because of their greater economy and flexibility.

SNCR processes, which are temperature dependent, generally utilize a nitrogenous substance such as urea or ammonia, as well as non-nitrogenous substances included as "enhancers" for the nitrogenous substances, and proceed in the gas phase by a complex series of free radical-mediated chemical reactions. Such reactions involve various nitrogen, hydrogen, oxygen, and carbon-containing species and radicals. Urea and ammonia differ, in that they appear to be most effective at different temperatures.

Unfortunately, it has recently been found that many nitrogenous substances, when introduced into a combustion effluent, have a temperature window (that is, an effluent temperature range within which they are effective at $NO_x$ reductions) which is not sufficiently broad to remain effective when the system being treated experiences frequent load swings and/or multiple fuel switching, or when only short chemical residence times are available.

In addition, since $NO_x$ emissions comprise a small amount of the total flue gas volume (e.g., about 100 parts per million (ppm) to about 1500 ppm), 100% chemical efficiency is unlikely to be achieved. Rather, chemical efficiency (which in practical terms is most conveniently expressed as the normalized stoichiometric ratio (NSR), a measure of the ratio of the nitrogen oxides reducing moiety to nitrogen oxides in the effluent) significantly less than 100% is expected. The NSR, therefore, for urea or ammonia is often required to be from 1.5 to 2.5 to obtain most $NO_x$ control requirements. Moreover, to achieve satisfactory nitrogen oxides reductions uniform and continuous distribution of the treatment chemical throughout the flue gas is needed.

As a result, when effluent conditions change, the treatment agent may actually lead to the production of undesirable byproducts such as ammonia (called ammonia slip or breakthrough) and carbon monoxide. This inefficient use of the treatment chemical can also lead to the generation of nitrous oxide. Nitrous oxide, which is defined differently than $NO_x$ for regulatory purposes, is coming to be recognized as a major pollutant, albeit secondary to nitrogen oxides.

Urea is generally considered the most desirable $NO_x$ reducing species because of its effectiveness and relatively broad temperature window, as well as its non-toxic and environmentally benign nature, when compared With ammonia. Urea, it is believed, breaks down in the effluent into the amidozine radical ($NH_2\cdot$), which appears to be the moiety responsible for the reduction of $NO_x$. However, urea can, under certain conditions, also break down into cyanic or isocyanic acid according to the following reaction formula $$2NH_2CONH_2 + OH \cdot \rightarrow 3NH_2\cdot + HOCN \text{ (or HNCO)} + H_2O + CO$$

The amidozine radical can then proceed to reduce $NO_x$ according to the following reaction pathway $$NH_2\cdot + NO \rightarrow N_2 + H_2O$$

but the cyanic or isocyanic acid produced can then proceed further to form nitrous oxide and carbon monoxide or molecular nitrogen and carbon dioxide when combined with $NO_x$ according to the following set of reactions $$HOCN \text{ (or HNCO)} + OH\cdot \rightarrow NCO\cdot + H_2O$$
$$NCO\cdot + NO \rightarrow N_2O + CO$$
$$NCO\cdot + NO \rightarrow N_2 + CO_2$$

When ammonia, carbon monoxide, or nitrous oxide is formed, the effectiveness of urea is somewhat decreased, although $NO_x$ is being substantially reduced, because other pollutant species are formed.

BACKGROUND ART

Processes and compositions for the reduction of nitrogen oxides in a combustion effluent have been developed extensively over recent years. With the increased attention to the health risks and environmental damage caused by agents such as smog and acid rain, it is expected that $NO_x$ reduction research will continue to be pursued.

In an early application of the use of nitrogenous treatment agents to reduce nitrogen oxides, Lyon in U.S. Pat. No. 3,900,554, describes a process for reducing nitrogen monoxide (NO) from combustion effluents by introducing ammonia or certain "ammonia precursors" into the effluent at temperatures which range from 1300° F. to 2000° F. In U.S. Pat. No. 4,208,386, Arand, Muzio, and Sotter improve on the Lyon process by teaching the introduction of urea for $NO_x$ reduction in oxygen-rich effluents at temperatures in the range of 1600° F. to 2000° F., when urea is introduced into the effluent alone, and 1300° F. to 1600° F. when urea is introduced with an ancillary reducing material. Arand, with Muzio and Teixeria, also teach the introduction of urea into fuel-rich combustion effluents to reduce nitrogen oxides at temperatures in excess of about 1900° F. in U.S. Pat. No. 4,325,924.

More recently, in a unique application of $NO_x$ reducing principles, Epperly, Peter-Hoblyn, Shulof, Jr., and Sullivan, in U.S. Pat. No. 4,777,024, teach a method for achieving substantial nitrogen oxides reductions while minimizing the production of so-called secondary pollutants, such as ammonia and carbon monoxide, through a multiple stage injection process. Moreover, Epperly, O'Leary, and Sullivan, in U.S. Pat. No. 4,780,289, have disclosed a complementary process for achieving significant, and potentially maximized, $NO_x$ reductions while minimizing the production of secondary pollutants. This process proceeds by utilizing the nitrogen oxides reduction versus effluent temperature curve of the treatment regimen being effected at each $NO_x$ reduction introduction in a combustion system.

In U.S. Pat. No. 4,861,567, Heap, Chen, McCarthy, and Pershing have disclosed a process which involves decomposing cyanuric acid in a fuel rich zone at 1000° F. to form isocyanic acid and other products, which are then introduced into a combustion effluent for the reduction of nitrogen oxides and sulfur oxides ($SO_x$). Furthermore, Azuhata, Kikuchi, Akimoto, Hishinuma, and Arikawa indicate in U.S. Pat. No. 4,119,702 that $NO_x$ reductions can be achieved at lower temperatures (i.e., 200° C. to 800° C.) by facilitating the decomposition of urea to $NO_x$-reducing radicals by injecting an oxidizing agent with urea.

In addition, Hofmann, Sprague, and Sun have disclosed in U.S. Pat. No. 4,997,631 that the introduction of ammonium carbamate into an effluent can achieve substantial nitrogen oxides reductions while avoiding the presence of nitrous oxide.

Schell, in U.S. Pat. Nos. 4,087,513 and 4,168,299, discloses processes for the hydrolysis of urea to ammonia and carbon dioxide to eliminate urea from the waste water stream formed during urea production. These processes involve introducing the waste water stream into a carbon dioxide recovery system, optionally in the presence of vanadium pentoxide.

These patents, though, do not suggest the use of urea hydrolysis products for nitrogen oxides reduction, and especially not the use of a unique urea hydrolysate for $NO_x$ reduction.

What is desired, therefore, is a system whereby nitrogen oxides reductions can be achieved at equivalent or lower NSR than conventional SNCR processes. Also desired are a wider temperature window, lower CO formation, $N_2O$ generation and $NH_3$ slip, and higher chemical utilization. This process should exhibit flexibility with reaction kinetics and residence time.

DISCLOSURE OF INVENTION

The present invention relates to the reduction of nitrogen oxides using the hydrolysis products of urea, which are effective at $NO_x$ reduction while avoiding the disadvantages of art-recognized SNCR processes. The use of such hydrolysis products has been found to achieve nitrogen oxides reductions generally greater under certain conditions than those achievable by the use of urea or ammonia with reduced byproduct emissions, higher utilization and greater flexibility. The inventive process also avoids the undesirable need for the storage and handling of ammonia.

The present invention also relates to a process for the in-line hydrolysis of urea. Through the application of this process, urea can be hydrolyzed in line as it is being supplied to a combustion effluent in order to produce the desired hydrolysis products.

BRIEF DESCRIPTION OF THE DRAWING

The present invention will be better understood and its advantages more apparent in view of the following detailed description, especially when read with reference to the appended drawings, wherein.

BEST MODE FOR CARRYING OUT THE INVENTION

As noted above, the present invention relates to the use of the hydrolysis products of urea for the reduction of nitrogen oxides. It is important to the successful practice of this invention to distinguish between the hydrolysis products of urea and the decomposition products of urea. Urea can thermally decompose to biuret and isocyanic acid at temperatures between about 302° F. and 440° F. with a concomitant major weight loss. From there, the decomposition proceeds to cyanuric acid and isocyanic acid at temperatures of about 450° F. to 620° F. Under the proper conditions, however, urea hydrolyzes to products which are believed to include ammonia ($NH_3$) ammonium carbamate ($NH_2COONH_4$) ("carbamate"), ammonium carbonate (($NH_4)_2CO_3$) ("carbonate"), and ammonium bicarbonate ($NH_4HCO_3$) ("bicarbonate"). Hydrolysis generally continues sequentially from carbamate, through carbonate and then to bicarbonate, each composition being more stable than the previous one.

Although each of the noted hydrolysis products is individually commercially available, it is more desirable to produce them via urea hydrolysis under the conditions detailed below. This is because the thusly formed hydrolysate has advantages over the individual hydrolysis products, even if combined in the same approximate ratios. A primary advantage is cost, since urea can be significantly less expensive than the individual hydrolysis products. Additionally, a maximum solubility of about 25% for the hydrolysate (based on initial urea concentration) has been observed, which is superior to the solubility of bicarbonate, i.e., about 18%. This can be significant in terms of transportation costs and final treatment agent concentrations.

According to solubility and structural analyses, including high pressure liquid chromatography (HPLC) using phosphoric acid as solvent; carbon-13 nuclear magnetic resonance spectroscopy (NMR); thermal gravimetric analysis (TGA); differential scanning calorimetry (DSC); and measurement of "P" or "M" alkalinity by acid titration, the hydrolysate prepared according to this invention comprises at least in part a single unique structure of carbonate and bicarbonate which is in a complex with carbamate (expressed as carbamate bicarbonate/carbonate). If the pressure exerted on the hydrolysate solution is sufficiently high, ammonia also produced does not flash off, but remains in solution and available to contribute to the reduction of $NO_x$. In addition, depending on the conditions employed, residual urea may also be present.

Although a urea solution will hydrolyze under ambient conditions, typically less than 1% will do so, an insignificant amount in terms of nitrogen oxides reductions. In forming the inventive hydrolysate, temperature, pressure, concentration of the initial urea solution, and residence time are all important parameters, and must be balanced. High pressure is particularly useful because the reaction proceeds in the direction of smaller mole volumes during the formation of carbamate and carbonate. Higher temperature and longer residence times also result in higher levels of hydrolysis. However, under equivalent pressures, temperatures and residence times, hydrolysis decreases with increases in solution concentration.

Advantageously, hydrolysis of a 10% aqueous urea solution should be conducted under pressures sufficiently high to maintain the resulting hydrolysate in solution. Such pressures will also facilitate hydrolysis. Desirably, hydrolysis is performed under pressures of at least about 500 pounds per square inch (psi), more preferably at least about 650 psi. If it is desired to maintain ammonia in solution, the pressure should be at least about 750 psi. As the concentration of the initial urea solution is increased, the pressure is preferably increased to achieve equivalent results.

There is no true upper limit of pressure in terms of facilitating hydrolysis; rather, any upper limits comprise practical as opposed to technical limits, since higher pressures, i.e., pressures above about 3000 psi, require vessels able to stand such pressures, which are generally more expensive and usually unnecessary At the desired pressures, the temperatures and residence times can be varied depending on the degree of hydrolysis sought. If relatively little hydrolysate is desired (i.e., no more than about 5%), temperatures of only about 250° F. are desired, whereas temperatures of about 600° F. to 700° F. will ensure that virtually all the urea has been converted to hydrolysate. Residence times can vary between about 3 minutes and about 14 minutes, preferably about 5 minutes to about 10 minutes. It will be recognized that the upper temperature and residence time limits are less important since exceeding them will not result in lower levels of hydrolysis or a less effective hydrolysate, it is believed.

The temperature and residence time for urea hydrolysis are related, and one (i.e., time) can be decreased as the other (i.e., temperature) is increased. For instance, hydrolysis at 400° F. for 10 minutes may be generally equivalent to hydrolysis at 500° F. for five minutes and hydrolysis at 600° F. for three minutes.

The degree of hydrolysis can be selected, depending on the condition of the effluent into which the hydrolysate is to be introduced. For instance, at relatively low effluent temperatures (i.e., below about 1700° F.) complete hydrolysis is probably most desirable in terms of achieving nitrogen oxides reduction while minimizing the emission of secondary pollutants like carbon monoxide, nitrous oxide, and ammonia. At higher temperatures, it may be desirable for urea to be present in the hydrolysate solution, so partial hydrolysis is called for. Depending on the particular effluent temperature, 80%, 50%, or even as low as about 10% or about 5% hydrolysis may be appropriate. For instance, at temperatures of about 2000° F. and higher, low levels of hydrolysis (i.e., about 10% or lower) are all that is believed necessary for effective effluent treatment.

When hydrolysis is performed on-site or in-line, as described in more detail below, the degree of hydrolysis can be adjusted in response to the effluent temperature, or in response to other indicia such as boiler load, which can be indicative of temperature. When the effluent temperature or the load changes, the hydrolysis reaction can be adjusted to create higher or lower hydrolysis levels (i.e., by varying hydrolysis temperature or time) to ensure that the desired treatment solution is being utilized.

A process and technique which can be utilized in adjusting the degree of hydrolysis in response to effluent condition is described in U.S. Pat. No. 4,780,289 and International Publication WO 89/02781 (the disclosures of each of which are incorporated herein by reference), which utilize the nitrogen oxides reduction versus effluent temperature curves of treatment agents such as the hydrolysate to control the presence of secondary pollutants while reducing $NO_x$.

As noted, hydrolysis proceeds to consecutively form carbamate, carbonate, and bicarbonate. Although all three are present even under the least severe conditions, it is desired that the ratio of carbamate to bicarbonate/carbonate in the hydrolysate be about 10:1 to about 1:9, more preferably about 2:1 to about 1:9 for most effective $NO_x$ reduction. This can be achieved by hydrolyzing at a temperature of at least about 375° F. for about 5 minutes and up.

Most preferably, the hydrolysis of urea is conducted in the presence of metal catalysts such as copper catalysts like copper nitrate, nickel catalysts like nickel sulfate, and iron catalysts like iron (III) nitrate, with the copper and nickel catalysts preferred. Since such catalysts enhance urea hydrolysis, greater reductions in nitrogen oxides can be achieved with equivalent hydrolysis conditions by the use of the catalysts. The catalyst metal is mixed into the urea solution prior to hydrolysis. For instance between about 5 and about 15, preferably about 10 ppm of catalyst (as metal) is mixed into a 10% urea solution, whereas about 40 to about 60, preferably about 50 ppm is mixed into a 25% urea solution.

The level of hydrolysis achieved under any particular set of conditions can easily be determined, for instance, by measuring the "P" and "M" alkalinity of the hydrolyzed solution. For example, a 10% solution of urea has a pH of 7.3 with 0 "P" alkalinity and 0.002% "M" alkalinity as $CaCO_3$. When completely hydrolyzed, the hydrolysate has a pH of about 9.5, with up to 9% "P" alkalinity and 20.2% "M" alkalinity. By comparing the alkalinity of a hydrolyzed solution with this theoretical maximum, using the fresh urea solution as a reference, the level of hydrolysis can be estimated.

Hydrolysis level can also be determined using conductivity in the same manner as alkalinity can be used. The conductivity of a 10% urea solution is about 1.2 milli-mhos, whereas a 10% urea solution which has been completely hydrolyzed has a conductivity of about 120 milli-mhos The urea hydrolysis reaction is advantageously carried out "on site" (by which is meant within convenient transport distance, such as about 50 miles, of the boiler to be treated), and, most advantageously, in-line because of the economy, stability and relative safety of urea for transport and storage. Further, the solubility of the hydrolysate is substantially lower than that of urea, making urea more practical to transport.

When the inventive hydrolysate is formed in-line, as discussed hereinbelow, the urea solution should comprise sufficient urea to provide the desired level of hydrolysate for substantial reduction of nitrogen oxides under the effluent and load conditions existing. Advantageously, the urea solution comprises up to about 50% urea by weight, more preferably about 5% to about 45% urea by weight. Most preferably, the solution comprises about 10% to about 25% urea by weight.

For efficiency, though, it may be desirable to hydrolyze a more concentrated urea solution, i.e., about 45% to about 60% by weight, to minimize the heat requirements during hydrolysis. This can most advantageously be done when hydrolysis is performed "on site" that is at or near the location of the boiler in which the hydrolysis products are to be introduced, but not in-line. The hydrolyzed solution can then be diluted to the appropriate level. On-site urea hydrolysis can be performed in a suitable vessel in which the urea solution can be raised to the desired pressures and temperatures.

As noted, hydrolysis of urea can also be performed in-line, that is, while the urea solution is being supplied to an injector or other introduction means to be introduced into a combustion effluent. This can be accomplished by passing the aqueous solution of urea through a supply conduit (referred to as a reaction conduit or tube) and applying heat and pressure.

The conduit can be any of the conventional tubes or pipes currently used to supply urea solutions to a combustion effluent in a $NO_x$ reducing apparatus or in operative connection therewith, provided the conduit length and flow rates are sufficient to provide the desired residence times, as would be understood by the skilled artisan. Thus the process can be practiced without significantly effecting the efficiency of current urea-mediated $No_x$ reducing processes since it does not require substantial alteration or retrofitting of current installations.

In fact, heat for the hydrolysis reaction can be provided by the effluent itself. As would be understood by the skilled artisan, a conventional heat exchanger can be installed which transfers the desired amount of heat from the effluent to the conduit through which the urea solution is flowing, in order to avoid the need for an independent heat source.

Once formed, the hydrolysate can be introduced into the effluent by suitable introduction means under conditions effective to reduce the effluent nitrogen oxides concentration in a selective, non-catalytic, gas-phase process. Suitable introduction means include injectors, such as those disclosed by Burton in U.S. Pat. No. 4,842,834, or DeVita in U.S. Pat. No. 4,915,036, the disclosures of each of which are incorporated herein by reference. One preferred type of injection means is an injection lance, especially a lance of the type disclosed by Peter-Hoblyn and Grimard in International Publication WO 91/00134, filed Jul. 4, 1989, entitled "Lance-Type Injection Apparatus for Introducing Chemical Agents into Flue Gases" the disclosure of which is incorporated herein by reference.

Generally, the inventive hydrolysate is introduced into the effluent to be treated for $NO_x$ reduction in an amount effective to elicit a reduction in the nitrogen oxides concentration in the effluent. Advantageously, the hydrolysate is introduced into the effluent in an amount sufficient to provide a molar ratio of the nitrogen contained in the solution to the baseline nitrogen oxides level (by which is meant the pretreatment level of $NO_x$ in the effluent) of about 1:5 to about 10:1. More preferably, the hydrolysate is introduced into the effluent to provide a molar ratio of solution nitrogen to baseline nitrogen oxides level of about 1:3 to about 5:1, most preferably about 1:2 to about 3:1.

The hydrolysate is preferably injected into the effluent gas stream at a point where the effluent is at a temperature above about 1300° F., more preferably above about 1400° F. Large industrial and circulating fluidized bed boilers of the types employed for utility power plants and other large facilities will typically have access only at limited points. In the most typical situations, the boiler interior in the area above the flame operates at temperatures which at full load approach 2200° F., even 2300° F. After subsequent heat exchange, the temperature will be lower, usually in the range between about 1300° F. and 2100° F. At these temperatures, the flexibility and broad temperature window of the hydrolysate can effectively accomplish substantial reduction of nitrogen oxides in the effluent without the drawbacks of prior art processes.

Optionally, the hydrolysate can be enhanced by other compositions such as hexamethylenetetramine (HMTA), oxygenated hydrocarbons such as ethylene glycol, ammonium salts of organic acids such as ammonium acetate and ammonium benzoate, heterocyclic hydrocarbons having at least one cyclic oxygen such as furfural, molasses, sugar, 5- or 6-membered heterocyclic hydrocarbons having at least one cyclic nitrogen such as pyridine and pyrolidine, hydroxy amino hydrocarbons such as milk or skimmed milk, amino acids, proteins, and monoethanolamine and various other compounds which are disclosed as being effective at reducing nitrogen oxides in an effluent. These "enhancers" which are preferably present in an amount of about 0.5% to about 25% by weight when employed, function to lower the effluent temperatures at which hydrolysate achieves its peak reductions of $NO_x$.

Such enhancers as well as others which may be suitable are disclosed in, for instance, U.S. Pat. Nos. 4,751,065; 4,927,612; 4,719,092; 4,888,164; 4,877,591; 4,803,059; 4,844,878; 4,873,066; 4,770,863; 4,902,488; 4,863,704; 4,863,705; and International Patent Application entitled "Composition for Introduction into a High Temperature Environment", Publication WO 89/10182, filed in the names of Epperly, Sprague, and von Harpe on Apr. 28, 1989, the disclosures of each of which are incorporated herein by reference.

When the hydrolysate is introduced without a non-nitrogenous hydrocarbon enhancer, it is preferably introduced at an effluent temperature of about 1500° F. to about 2100° F., more preferably about 1550° F. to about 2100° F. When the hydrolysate solution also comprises one of the enhancers discussed above, it is preferably introduced at an effluent temperature of about 1300° F. to about 1700° F., more preferably about 1400° F. to about 1600° F. or higher. The usefulness of introduction of the hydrolysate at these effluent temperatures can depend on the particular components of the treatment agent (i.e., hydrolysate solution) and other effluent conditions, such as the effluent oxygen level.

The effluent into which the hydrolysate of this invention is injected is preferably oxygen-rich, meaning that there is an excess of oxygen in the effluent. Advantageously, the excess of oxygen is greater than about 1% by volume. Most preferably, the excess of oxygen is in the range of about 1% to about 12% or greater by volume.

The use of the inventive hydrolysate for $NO_x$ reduction according to the process of the present invention can be a part of a multi-stage treatment regimen which will reduce effluent nitrogen oxides. Such processes are discussed in, for instance, U.S. Pat. No. 4,777,024 to Epperly, Peter-Hoblyn, Shulof, Jr., and Sullivan, as well as International Publication WO 89/02780, the disclosures of each of which are incorporated herein by reference. For instance, in a first stage of such a process, $NO_x$ is reduced using the hydrolysate as described above. In a second stage, the hydrolysate, at a higher level of hydrolysis, is then effected by the means described above. In the alternative, the first stage can comprise a urea or ammonia solution, and the second stage a hydrolysate solution; or the first stage can comprise a hydrolysate solution and the second a urea or ammonia solution, etc. By doing so, the advantages of the use of the hydrolysate are maximized.

The use of the hydrolysate to reduce nitrogen oxides in a combustion effluent, especially when compared with the use of urea or ammonia, has been found to provide several important advantages. At lower effluent temperatures (i.e., below about 1700° F.), higher reductions of nitrogen oxides are observed with greater chemical utilization, and lower NSR requirements. The hydrolysate has a wider temperature window with lower ammonia slip at effluent temperatures greater than about 1600° F., and reduced generation of nitrous oxide and emission of carbon monoxide. The kinetic flexibility of the hydrolysate is superior, with equivalent or better performance at shorter residence times. Moreover, the hydrolysate comprises virtually all volatiles, with no solids residue.

The widened temperature window of the hydrolysate is believed to be due to the presence of different components (i.e., carbamate, carbonate, bicarbonate, ammonia, and residual urea), each of which have different reaction kinetics. Since the compositions are "released" for $NO_x$ reduction at different times, with ammonia and bicarbonate more kinetically reactive, followed in order of reactivity by carbonate, carbamate and urea, the effective temperature window is wider than any of the individual components.

In addition, the advantages of the hydrolysate are thought to be due to its lower thermal stability and increased alkalinity/basicity/electrophilicity as compared with urea. For reasons not yet determined, hydrolysate formed in a catalyzed hydrolysis reaction is more kinetically reactive than hydrolysate produced without a catalyst.

Figure 1:
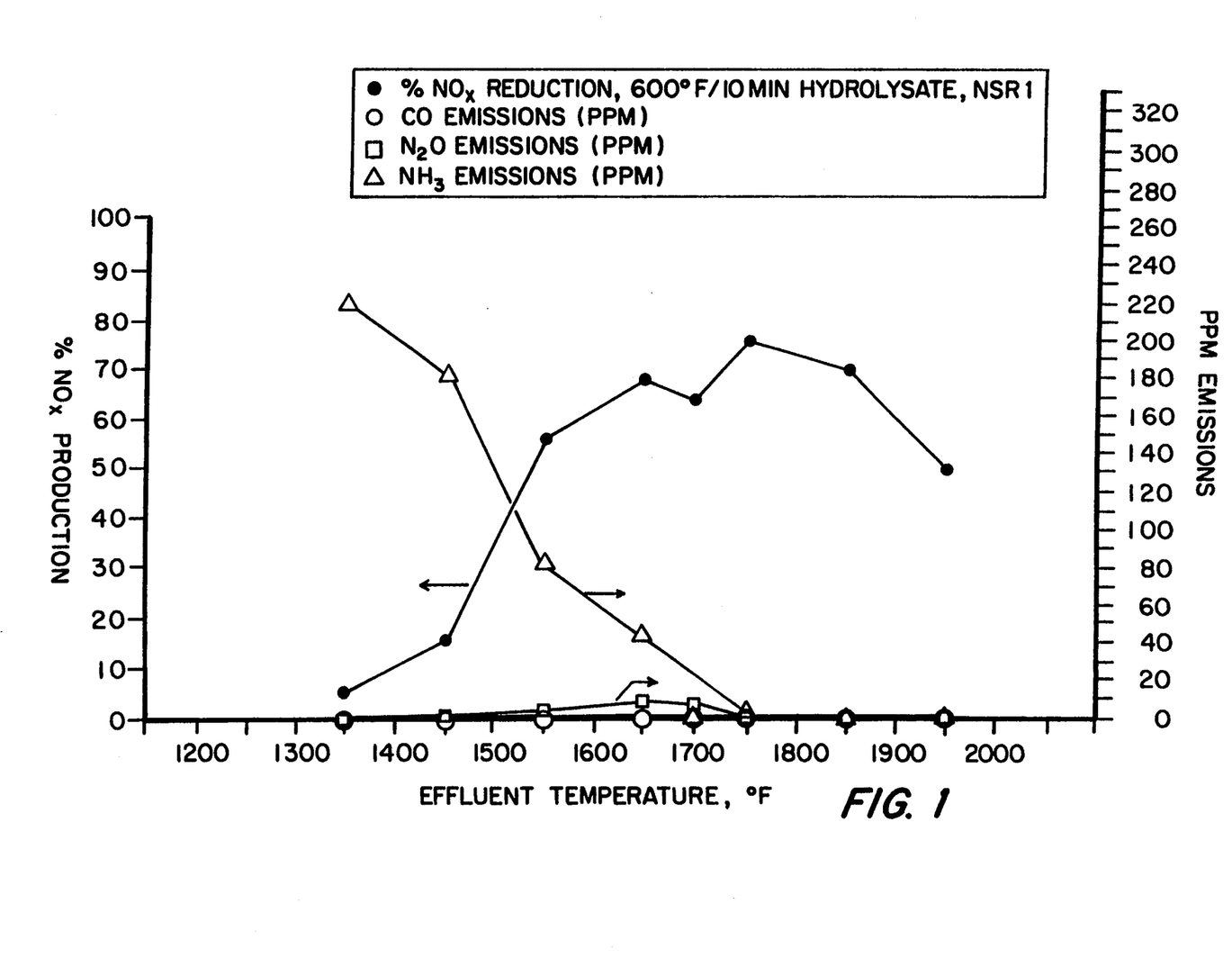
FIG. 1 is a graphical representation of the indicated portions of the results of Example IIIc.
Figure 2:
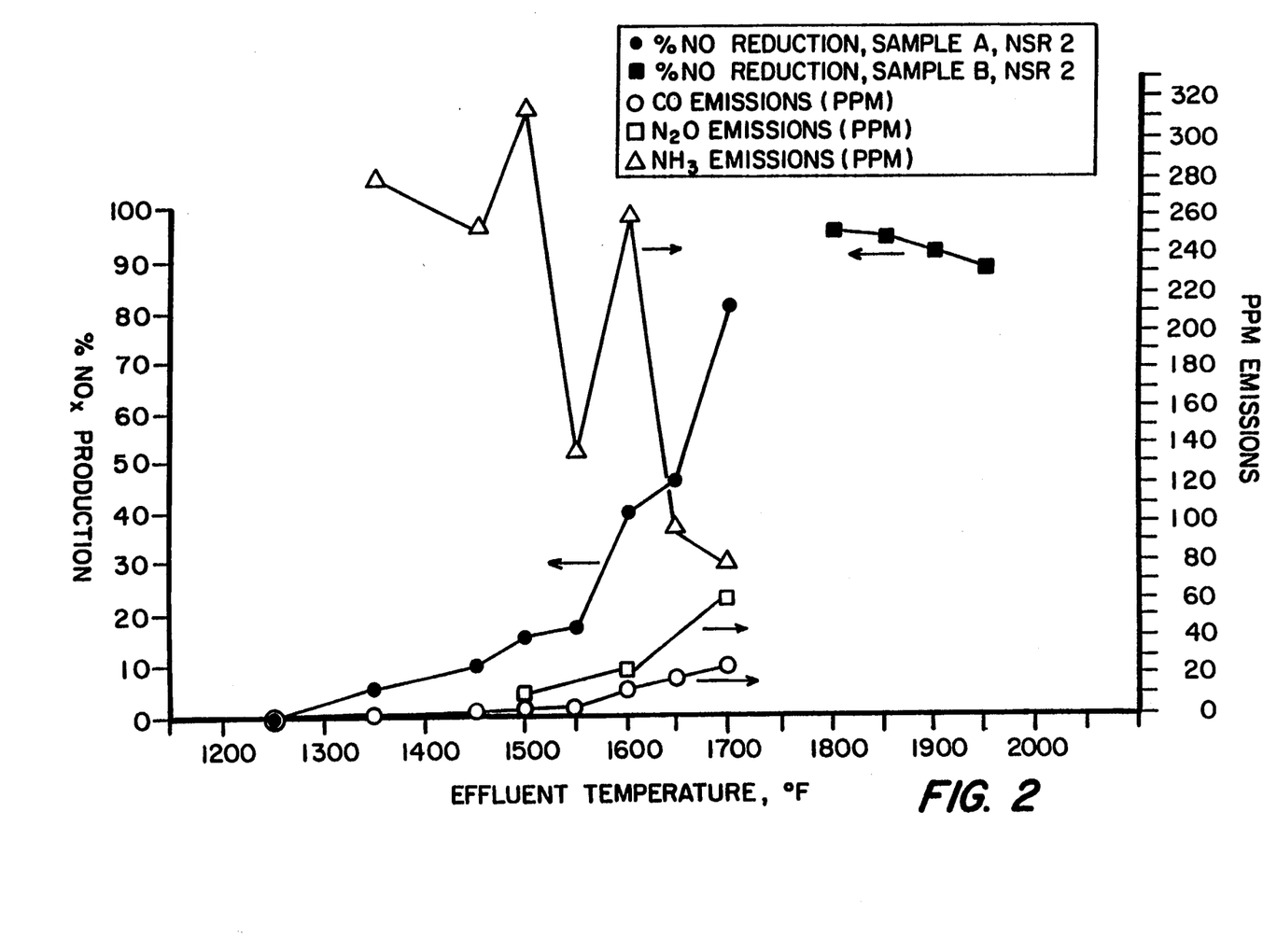
FIG. 2 is a graphical representation of the indicated portions of the results of Example IVa.

The advantages of the use of the present invention are illustrated by reference to FIGS. 1 and 2 which graphically reproduce portions of the results of Examples III and IV. These figures directly compare $NO_x$ reductions using the inventive hydrolysate with $NO_x$ reductions using urea. As will be clear, even at half the NSR, significant reductions in nitrogen oxides are achieved with minimized emissions of secondary pollutants.

The formation and measurement of hydrolysate and the use of it to achieve the reduction of the nitrogen oxides concentration in a combustion effluent is illustrated by reference to the following examples.

EXAMPLE I

The influence of temperature and residence time on the preparation of the inventive hydrolysate is illustrated by forming a 10% solution of urea in water and exposing the solution to differing temperatures and residence times under 800 psi pressure, and then determining the composition of the resulting solution. The results are set out in Table 1.

TABLE 1

| Residence Temp. Time | Components Found |
|---|---|
| 300° F./5 min. | Urea (major, > 90% retained) Carbamate, Biuret Carbonate/Bicarbonate |
| 300° F./10 min. | Urea (major, 87% retained) Carbamate, Carbonate/Bicarbonate |
| 400° F./10 min. | Urea (minor, 10% retained) Carbamate, Bicarbonate/Carbonate Ammonia |
| 500° F./10 min. | Carbamate, Bicarbonate/Carbonate (higher percentage than at 400° F.) Ammonia |
| 600° F./10 min. | Carbamate, Bicarbonate/Carbonate (higher percentage than at 500° F.) Ammonia |

EXAMPLE II

The pH and alkalinity of the inventive hydrolysate when compared with various solutions of urea is illustrated by exposing a 10% solution of urea to hydrolysis conditions under 800 psi pressure. The results, including the temperature and time of hydrolysis, is set out in Table 2a.

TABLE 2a

| Temperature | Residence Time | pH | % Alkalinity "P" | "M" |
|---|---|---|---|---|
| 300° F. | 5 min. | 9.45 | 0.8 | 2.4 |
| 300° F. | 10 min. | 9.45 | 1.8 | 4.4 |
| 400° F. | 10 min. | 9.50 | 9.2 | 19.0 |
| 500° F. | 5 min. | 9.50 | 8.8 | 20.1 |
| 500° F. | 10 min. | 9.50 | 8.5 | 20.1 |
| 600° F. | 3 min. | 9.52 | 9.0 | 19.9 |
| 600° F. | 5 min. | 9.55 | 7.0 | 20.1 |
| 600° F. | 10 min. | 9.45 | 6.0 | 20.1 |

The pH and alkalinity of the hydrolysate set out in Table 2a is compared with the pH and alkalinity of various solutions of urea, including a 10% urea solution made from freshly made urea prills, which is solid urea treated with formaldehyde and other anti-caking agents and flow enhancers (Sample A); a 10% solution of urea made from urea prills which had been stored for 24 days (Sample B); and a 10% solution of urea of unknown age purchased from Arcadian Corporation of Memphis, Tenn. (Sample C). The pH and alkalinity of each of these solutions is set out in Table 2b.

TABLE 2b

| Sample | pH | Alkalinity "P" | "M" |
|---|---|---|---|
| A | 7.30–8.15 | 0 | 0.002 |
| B | 8.50 | 0.003 | 0.006 |
| C | 9.55 | 0.21 | 0.37 |

Accordingly, reference to Tables 2a and 2b makes it clear that the hydrolysate prepared according to the present invention differs substantially from what is present in a urea solution not treated under hydrolysis conditions described above.

EXAMPLE IIIa

The ability of the inventive hydrolysate to reduce nitrogen oxides without the generation of substantial amounts of other byproducts is illustrated by heating a 10% aqueous solution of urea at 300° F. for either 5 or 10 minutes under 800 psi pressure. The resulting solutions are introduced into a flame tube, by which is meant a burner having an effluent flue conduit, known as a combustion tunnel, approximately 209 inches in length and having an internal diameter of 8 inches and walls 2 inches thick. The burner has a flame area adjacent the effluent entry port to measure the concentration of compositions such as nitrogen oxides, nitrous oxide, sulfur oxides, ammonia, carbon monoxide, carbon dioxide, percent excess oxygen, and other compounds of interest which may be present in the effluent.

The effluent flue conduit additionally has thermocouple ports for temperature measurement at various locations. The temperature of the effluent into which the hydrolysate is introduced is measured at the point of injection utilizing a K-type thermocouple. The hydrolysate is introduced via atomizing injectors positioned through ports in the effluent flue conduit to distribute the hydrolysate into the effluent stream. The burner fuel is a #2 fuel oil.

The results, including temperature and time of hydrolysis, NSR, effluent temperature at the point of introduction, average percent $NO_x$ reduction, and the amount of carbon monoxide, nitrous oxide, and ammonia generated are set out in Table 3a.

TABLE 3a

| Residence Temp./Time | NSR | Effluent Temp. °F. | Average % NOx Reduction | CO (ppm) | N2O (ppm) | NH3 (ppm) |
|---|---|---|---|---|---|---|
| 300° F./5 min | 2.0 | 1400 | 6 | 1.5 | 6.5 | 253 |
| 300° F./5 min | 2.0 | 1500 | 17 | 3.5 | 7.5 | 345 |
| 300° F./5 min | 2.0 | 1600 | 49 | 10.8 | 20.0 | 253 |
| 300° F./5 min | 2.0 | 1700 | 89 | 18.0 | 56.0 | 79 |
| 300° F./10 min | 1.6 | 1750 | 95 | 9.5 | 54.0 | 58 |
| 300° F./10 min | 1.0 | 1350 | 4 | 0.7 | 0.0 | 130 |
| 300° F./10 min | 1.0 | 1450 | 7 | 1.8 | 4.0 | 140 |
| 300° F./10 min | 1.0 | 1550 | 25 | 4.5 | 10.0 | 101 |
| 300° F./10 min | 1.0 | 1650 | 50 | 11.3 | 24.0 | 35 |
| 300° F./10 min | 1.0 | 1700 | 57 | 11.2 | 32.0 | 18 |
| 300° F./10 min | 1.0 | 1750 | 81 | 5.2 | 52.0 | 12 |
| 300° F./10 min | 1.0 | 1850 | 77 | 0.4 | 38.0 | 0 |
| 300° F./10 min | 1.0 | 1950 | 63 | 0.0 | 13.0 | 0 |

EXAMPLE IIIb

The procedure of Example IIIa is repeated except that the urea solution is hydrolyzed at a temperature of 400° F. The results are set out in Table 3b.

TABLE 3b

| Residence Temp./Time | NSR | Effluent Temp. °F. | Average % NOx Reduction | CO (ppm) | N2O (ppm) | NH3 (ppm) |
|---|---|---|---|---|---|---|
| 400° F./10 min | 2.0 | 1400 | 13 | 0.5 | 0.0 | 457 |
| 400° F./10 min | 2.0 | 1500 | 38 | 1.3 | 5.0 | 385 |
| 400° F./10 min | 2.0 | 1500 | 33 | 1.1 | | |
| 400° F./10 min | 2.0 | 1600 | 78 | 3.9 | 29.5 | 115 |
| 400° F./10 min | 2.0 | 1700 | 93 | 3.0 | 26.5 | 43 |
| 400° F./10 min | 2.0 | 1700 | 87 | 2.3 | 17.0 | |
| 400° F./10 min | 1.6 | 1750 | 88 | 1.0 | 16.0 | 5 |
| 400° F./10 min* | 1.6 | 1750 | 93 | 1.6 | 18.0 | 9 |
| 400° F./10 min | 1.0 | 1350 | 6 | 0.0 | 0.0 | 204 |
| 400° F./10 min | 1.0 | 1450 | 12 | 0.1 | 3.0 | 192 |
| 400° F./10 min | 1.0 | 1500 | 32 | 0.2 | 3.0 | 166 |
| 400° F./10 min | 1.0 | 1550 | 53 | 1.5 | 10.0 | 96 |
| 400° F./10 min | 1.0 | 1600 | 59 | 0.8 | 9.0 | 28 |
| 400° F./10 min | 1.0 | 1650 | 67 | 1.9 | 14.0 | 16 |
| 400° F./10 min | 1.0 | 1700 | 58 | 0.0 | 8.0 | 4 |
| 400° F./10 min | 1.0 | 1700 | 64 | 1.2 | 14.0 | 3 |
| 400° F./10 min | 1.0 | 1750 | 66 | 0.4 | 14.0 | 2 |
| 400° F./10 min | 1.0 | 1850 | 59 | 0.0 | 11.0 | 0 |
| 400° F./10 min | 1.0 | 1950 | 46 | 0.0 | 0.0 | 11 |

*hydrolyzed at 1800 psi

EXAMPLE IIIc

The process of Example IIIa is repeated, except the hydrolysate is formed at a temperature of 600° F. The results are set out in Table 3c.

TABLE 3c

| Residence Temp./Time | NSR | Effluent Temp. °F. | Average % NOx Reduction | CO (ppm) | N2O (ppm) | NH3 (ppm) |
|---|---|---|---|---|---|---|
| 600° F./5 min | 2.0 | 1400 | 16 | 0.4 | 0.0 | 481 |
| 600° F./5 min | 2.0 | 1500 | 43 | 0.7 | 6.0 | 445 |
| 600° F./5 min | 2.0 | 1600 | 79 | 1.0 | 28.0 | 94 |
| 600° F./10 min | 2.0 | 1600 | 78 | 0.8 | 14.0 | 46 |
| 600° F./5 min | 2.0 | 1700 | 89 | 0.8 | 20.0 | 46 |
| 600° F./10 min | 2.0 | 1700 | 85 | 0.5 | 12.0 | 11 |
| 600° F./10 min | 1.6 | 1750 | 88 | 0.0 | 11.0 | 2 |
| 600° F./10 min | 1.0 | 1350 | 5 | 0.0 | 0.0 | 219 |
| 600° F./10 min | 1.0 | 1450 | 15 | 0.0 | 2.0 | 180 |
| 600° F./10 min | 1.0 | 1550 | 58 | 0.0 | 6.0 | |
| 600° F./10 min | 1.0 | 1550 | 57 | 0.1 | 6.0 | 82 |
| 600° F./10 min | 1.0 | 1650 | 67 | 0.0 | 10.0 | 13 |
| 600° F./10 min | 1.0 | 1700 | 63 | 0.0 | 9.0 | 0 |
| 600° F./10 min | 1.0 | 1750 | 75 | 0.0 | 0.0 | 3 |
| 600° F./10 min | 1.0 | 1850 | 70 | 0.0 | 0.0 | 0 |
| 600° F./10 min | 1.0 | 1950 | 50 | 0.0 | 0.0 | 0 |

EXAMPLE IVa

As a comparison, the process of Example IIIa is repeated, except a 50% solution of urea is introduced into the effluent for $NO_x$ reduction. The urea solution introduced comprises either a solution formed from existing stocks of urea (A); a solution formed from newly made urea prills (B); a solution formed from urea obtained from Arcadian Corporation of Memphis, Tenn. of unknown age (C); and a solution formed from urea prills which are 24 days old (D). The results are set out in Table 4a.

TABLE 4a

| Sample | NSR | Effluent Temp. °F. | Average * NOx Reduction | CO (ppm) | N2O (ppm) | NH3 (ppm) |
|---|---|---|---|---|---|---|
| A | 2.0 | 1250 | 0.00 | 0.00 | | |
| A | 2.0 | 1350 | 6.00 | 1.35 | | 276 |
| B | 2.0 | 1400 | 7.00 | 2.30 | | |
| A | 2.0 | 1450 | 9.70 | 2.40 | | 253 |
| A | 2.0 | 1500 | 15.00 | 4.30 | 7.0 | 349 |
| C | 2.0 | 1500 | 16.00 | 4.00 | 6.5 | 349 |
| C | 2.0 | 1500 | 15.00 | 4.00 | 7.5 | 287 |
| A | 2.0 | 1500 | 15.00 | 4.00 | 9.0 | 313 |
| A | 2.0 | 1500 | 15.50 | 4.25 | | 240 |
| A | 2.0 | 1550 | 16.50 | 5.15 | | 135 |
| A | 2.0 | 1600 | 26.33 | 8.78 | | 130 |
| A | 2.0 | 1600 | 41.00 | 12.00 | 19.5 | 260 |
| C | 2.0 | 1600 | 41.00 | 11.00 | 18.0 | 253 |
| A | 2.0 | 1650 | 46.33 | 16.10 | | 96 |
| A | 2.0 | 1700 | 72.67 | 22.93 | | 72 |
| A | 2.0 | 1700 | 82.00 | 23.00 | 59.0 | 79 |
| C | 2.0 | 1700 | 82.00 | 22.00 | 56.0 | 89 |
| C | 2.0 | 1700 | 87.00 | 21.00 | 61.0 | 79 |
| D | 2.0 | 1800 | 96.00 | 1.20 | | |
| D | 2.0 | 1850 | 95.00 | 0.70 | | |
| D | 2.0 | 1900 | 92.00 | 0.30 | | |
| D | 2.0 | 1950 | 88.00 | 0.00 | | |
| C | 1.6 | 1750 | 94.00 | 9.00 | 61.0 | 46 |
| C | 1.0 | 1750 | 82.00 | 5.80 | 56.0 | 13 |
| C | 1.0 | 1750 | 85.00 | 5.60 | 61.0 | 12 |
| C | 1.0 | 1850 | 80.00 | 0.20 | 42.0 | 0 |
| C | 1.0 | 1950 | 65.00 | 0.00 | 15.0 | 0 |

EXAMPLE IVb

The process of Example IVa is repeated, except that the sample injected into the effluent is a solution comprising 50% urea and 12.5% molasses. The results are set out in Table 4b.

TABLE 4b

| NSR | Effluent Temp. °F. | % NOx Removal | CO (ppm) | N2O (ppm) | NH3 (ppm) |
|---|---|---|---|---|---|
| 2 | 1250 | 25 | | | 183 |
| 2 | 1350 | 33 | 250.0 | | |
| 2 | 1350 | 39 | 200.0 | | |
| 2 | 1400 | 38 | | | 164 |
| 2 | 1400 | 40 | 123.0 | | |
| 2 | 1450 | 47 | 120.0 | | |
| 2 | 1450 | 47 | | | |
| 2 | 1500 | 51 | 147.0 | | |
| 2 | 1500 | 56 | 116.0 | | |
| 2 | 1500 | 54 | | | 114 |
| 2 | 1500 | 55 | 152.0 | | |
| 2 | 1550 | 63 | 140.0 | | |
| 2 | 1600 | 87 | 69.0 | | 55 |
| 2 | 1600 | 85 | 39.0 | | |
| 2 | 1600 | 78 | 95.0 | | |
| 2 | 1650 | 86 | 25.0 | | |
| 2 | 1650 | 93 | 9.5 | | |
| 2 | 1650 | 86 | 11.0 | | |
| 2 | 1685 | 87 | 12.0 | | |
| 2 | 1700 | 98 | 7.0 | | 25 |
| 2 | 1750 | 100 | 3.4 | 61 | 20 |
| 2 | 1850 | 94 | 0.8 | 47 | 5 |
| 2 | 1950 | 71 | 0.0 | 13 | |
| 1 | 1750 | 81 | 1.0 | 45 | 0 |
| 1 | 1950 | 57 | 0.0 | 10 | |

EXAMPLE IVc

The process of Example IVa is repeated, except that the sample injected comprises a 9.0% aqueous solution of ammonia. The results are set out in Table 4c.

TABLE 4c

| NSR | Effluent Temp. °F. | % NOx Removal | CO (ppm) | N2O (ppm) | NH3 (ppm) |
|---|---|---|---|---|---|
| 2 | 1250 | 0 | 0.00 | | 337 |
| 2 | 1350 | 3 | 0.54 | | |
| 2 | 1400 | 0 | 0.00 | | 288 |
| 2 | 1400 | 8 | 0.50 | | |
| 2 | 1450 | 12 | 0.20 | | |
| 2 | 1500 | 19 | 0.00 | | 265 |
| 2 | 1500 | 17 | 0.10 | | |
| 2 | 1550 | 40 | 0.30 | | |
| 2 | 1600 | 73 | 0.10 | | 51 |
| 2 | 1600 | 66 | 0.30 | | |
| 2 | 1650 | 70 | 0.20 | | |
| 2 | 1685 | 77 | 0.00 | | |
| 2 | 1700 | 85 | 0.00 | | 4 |
| 2 | 1750 | 92 | 0.00 | 7 | |
| 2 | 1850 | 92 | 0.00 | 0 | 0 |
| 2 | 1950 | 59 | 0.00 | 0 | |
| 2 | 2050 | 0 | | | |
| 1 | 1750 | 71 | 0.00 | 8 | 0 |
| 1 | 1850 | 58 | 0.00 | 7 | 0 |
| 1 | 1950 | 41 | 0.00 | 0 | 0 |

EXAMPLE IVd

The process of Example IVa is repeated, except that the sample introduced comprises a 17.6% solution of ammonium formate. The results are set out in Table 4d.

TABLE 4d

| NSR | Effluent Temp. °F. | % NOx Removal | CO (ppm) | N2O (ppm) | NH3 (ppm) |
|---|---|---|---|---|---|
| 2 | 1230 | 38 | 74.0 | | |
| 2 | 1250 | 41 | 67.0 | | 159 |
| 2 | 1300 | 51 | 68.0 | | |
| 2 | 1350 | 56 | 60.0 | | |
| 2 | 1400 | 56 | 40.0 | | 34 |
| 2 | 1450 | 59 | 40.0 | | |
| 2 | 1500 | 60 | 26.0 | | 24 |
| 2 | 1500 | 58 | 28.0 | | |
| 2 | 1500 | 64 | 27.0 | | |
| 2 | 1550 | 55 | 8.6 | | |
| 2 | 1600 | | 3.2 | 10 | |
| 2 | 1600 | 50 | 3.8 | | |
| 2 | 1650 | 52 | 1.7 | | |
| 2 | 1683 | 53 | 0.6 | | |
| 2 | 1700 | | 0.0 | | 3 |
| 2 | 1750 | 39 | 0.4 | 16 | 0 |
| 2 | 1850 | 35 | 0.0 | 12 | 0 |
| 2 | 1950 | 2 | 0.0 | 7 | 0 |
| 1 | 1750 | 26 | 0.0 | 10 | 0 |
| 1 | 1950 | −1 | 0.0 | 8 | |

EXAMPLE IVe

The process of Example IVa is repeated, except that the sample introduced comprises a 9.3% solution of ammonium carbamate. The results are set out in Table 4e.

TABLE 4e

| NSR | Effluent Temp. °F. | % NOx Removal | CO (ppm) | N2O (ppm) | NH3 (ppm) |
|---|---|---|---|---|---|
| 2 | 1400 | 19 | 0.3 | 2 | 397 |
| 2 | 1500 | 63 | 1.0 | 12 | 217 |
| 2 | 1600 | 73 | 0.5 | 16 | 70 |
| 2 | 1624 | 77 | 0.5 | | |
| 2 | 1700 | 80 | 0.0 | 10 | 10 |
| 2 | 1750 | 99 | 0.0 | 9 | 14 |
| 2 | 1850 | 92 | 0.0 | 0 | 0 |
| 2 | 1950 | 62 | 0.0 | 0 | |
| 1 | 1750 | 73 | 0.0 | 0 | 0 |

TABLE 4e-continued

| NSR | Effluent Temp. °F. | % NOx Removal | CO (ppm) | N2O (ppm) | NH3 (ppm) |
|---|---|---|---|---|---|
| 1 | 1950 | 43 | 0.0 | 0 | |

EXAMPLE IVf

The process of Example IVa is repeated, except that the sample introduced comprises a 14.6% solution of ammonium bicarbonate. The results are set out in Table 4f.

TABLE 4f

| NSR | Effluent Temp. °F. | % NOx Removal | CO (ppm) | N2O (ppm) | NH3 (ppm) |
|---|---|---|---|---|---|
| 1 | 1550 | 58 | 0.8 | 5.6 | 48 |
| 1 | 1600 | 58 | 0.0 | 7.0 | 18 |
| 1 | 1650 | 68 | 0.5 | 6.0 | 12 |
| 1 | 1700 | 66 | 0.0 | 5.0 | 5 |
| 1 | 1750 | 67 | 0.0 | 5.5 | 0 |
| 1 | 1750 | 66 | 0.0 | 6.2 | 0 |
| 1 | 1850 | 57 | 0.0 | 4.5 | 0 |
| 1 | 1850 | 58 | 0.0 | 4.8 | 0 |
| 1 | 1950 | 50 | 0.0 | 3.3 | 0 |
| 1 | 1750 | 62 | 0.0 | 0.0 | 0 |
| 1 | 1850 | 56 | 0.0 | 0.0 | 0 |
| 1 | 1950 | 51 | 0.0 | 0.0 | 0 |

A comparison of the results of Examples III and IV clearly shows the advantages of the use of the inventive hydrolysate over urea, ammonia, and related treatment agents, as well as ammonium carbamate and ammonium bicarbonate.

EXAMPLE V

In order to illustrate the advantages of forming the inventive hydrolysate in the presence of catalyst metal, the procedure of Example III is repeated, except that the treatment sample introduced comprises a 20% solution of urea hydrolyzed under 800 psi at 400° F. temperature for 10 minutes in the presence of 30 ppm copper (Sample A); as a comparison, a sample is prepared comprising a 20% aqueous solution of urea containing 30 ppm copper (Sample B); a treatment sample comprising a 12.5% solution of urea which is hydrolyzed under 800 psi pressure at 400° F. for minutes in the presence of 50 ppm copper (Sample C); as a comparison, a sample comprising a 12.5% aqueous solution of urea containing 50 ppm copper (Sample D); and as a control, a 50% solution of urea is introduced containing no catalyst metal (Sample E). The results are set out in Table 5.

TABLE 5

| Sample | Effluent Temp. °F. | % NOx Removal | N2O (ppm) | CO (ppm) | NH3 (ppm) |
|---|---|---|---|---|---|
| A (with metal) | 1550 | 45.0 | 4.0 | 1.3 | 42.0 |
| A | 1650 | 57.0 | 7.0 | 1.3 | 14.0 |
| A | 1750 | 55.0 | 8.0 | 0.3 | 0.0 |
| A | 1850 | 47.0 | 11.0 | 0.0 | 0.0 |
| A | 1950 | 40.0 | 11.0 | 0.0 | 0.0 |
| B (no metal) | 1550 | 17.0 | 6.0 | 4.2 | 96.0 |
| B | 1650 | 36.0 | 12.0 | 9.2 | 72.0 |
| B | 1750 | 58.0 | 28.0 | 6.4 | 17.0 |
| B | 1850 | 55.0 | 35.0 | 0.5 | 0.0 |
| B | 1950 | 50.0 | 22.0 | 0.0 | 0.0 |
| C (with metal) | 1550 | 51.0 | 4.0 | 0.9 | 37.0 |
| C | 1650 | 62.0 | 5.0 | 0.7 | 23.0 |
| C | 1750 | 58.0 | 7.0 | 0.0 | 3.0 |
| C | 1850 | 50.0 | 8.0 | 0.0 | 0.0 |
| C | 1950 | 43.0 | 7.0 | 0.0 | 0.0 |
| D (no metal) | 1550 | 19.0 | 5.0 | 4.0 | 125.0 |
| D | 1650 | 39.0 | 9.0 | 7.0 | 72.0 |
| D | 1750 | 64.0 | 41.0 | 7.8 | 15.0 |
| D | 1850 | 62.0 | 38.0 | 0.8 | 7.0 |
| D | 1950 | 56.0 | 22.0 | 0.0 | 0.0 |
| E (control) | 1550 | 18.0 | 6.0 | 4.4 | 108.0 |
| E | 1650 | 37.0 | 12.0 | 10.0 | 84.0 |
| E | 1750 | 61.0 | 41.0 | 6.0 | 11.0 |
| E | 1850 | 59.0 | 37.0 | 0.8 | 3.0 |
| E | 1950 | 53.0 | 20.0 | 0.0 | 0.0 |

It will be noted that forming the inventive hydrolysate in the presence of catalyst metal results in increases in $NO_x$ reduction, especially at lower temperatures, and advantages in reducing the generation of byproducts such as nitrous oxide, carbon monoxide, and ammonia.

It is to be understood that the above examples are given by way of illustration only and are not to be construed as limiting the invention.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for the reduction of nitrogen oxides in a combustion effluent, the process comprising:
   a) subjecting an aqueous solution of urea to heat and pressure for a time sufficient to hydrolyze at least 5% of said urea to a hydrolysate comprising a complex of ammonium carbamate with ammonium bicarbonate and ammonium carbonate, where the ratio of ammonium carbamate to ammonium bicarbonate and ammonium carbonate is about 10:1 to about 1:9; and
   b) thereafter introducing said hydrolysate into the effluent under conditions effective to reduce the nitrogen oxides concentration therein.

2. The process of claim 1, wherein said pressure is at least about 500 psi.

3. The process of claim 2, wherein said aqueous urea solution is heated to at least 300° F. for from about three minutes to about 14 minutes to at least partially hydrolyze said urea.

4. The process of claim 3, wherein said aqueous urea solution is hydrolyzed on site.

5. The process of claim 4, wherein said aqueous urea solution is hydrolyzed in-line.

6. The process of claim 1, wherein the urea solution is contacted with a catalyst for the hydrolysis of urea, said catalyst comprising copper, nickel, copper oxide, nickel oxide, or the nitrate or sulfate salts of metals, or mixtures thereof.

7. A process for the reduction of nitrogen oxides in a combustion effluent, the process comprising:
   a) flowing an aqueous urea solution through a conduit in operative communication with a means for introduction of a solution into the effluent;
   b) subjecting said aqueous solution of urea to heat and pressure for a time sufficient to hydrolyze at least 5% of said urea while flowing through said conduit to a hydrolysate comprising a complex of ammonium carbamate with ammonium bicarbonate and ammonium carbonate, where the ratio of ammonium carbamate to ammonium bicarbonate and ammonium carbonate is about 10:1 to about 1:9; and c) introducing said hydrolysate into the effluent by said introduction means under conditions effective to reduce the nitrogen oxides concentration therein.

8. The process of claim 7, wherein the urea solution is heated to a temperature of at least about 300° F. for from about three minutes to about 14 minutes.

9. The process of claim 8, wherein the urea solution is subjected to a pressure of at least about 500 psi.

10. The process of claim 7, wherein the urea solution is contacted with a catalyst for the hydrolysis of urea, said catalyst comprising copper, nickel, copper oxide, nickel oxide, or the nitrate or sulfate salts of metals, or mixtures thereof.

* * * * *

UNITED STATES PATENT AND TRADEMARK OFFICE
CERTIFICATE OF CORRECTION

PATENT NO. : 5,399,325
DATED : March 21, 1995
INVENTOR(S) : Thure von Harpe, et al.

It is certified that error appears in the above-indentified patent and that said Letters Patent is hereby corrected as shown below:

At column 2, line 40, "compared With ammonia." should read --compared with ammonia--.

At column 4, line 5, delete "." immediately after "conventional".

At column 4, line 53, insert "," immedately after "($NH_3$)".

At column 6, line 65, "0,002%" should read --0.002%--.

At column 13, line 3, "* NOx" should read --% NOx--.

At column 13, line 68, "are-set" should read --are set--.

At column 14, line 42, delete "10" in column entitled $N_2O$ (ppm) and insert --10-- in column entitled $NH_3$ (ppm).

At column 14, line 55, "are,set" should read --are set--.

At column 15, line 47, insert "10" immediately after "400° F. for".

Signed and Sealed this

Eleventh Day of July, 1995.

Attest:

BRUCE LEHMAN

*Attesting Officer*     *Commissioner of Patents and Trademarks*